(12) United States Patent
Chen

(10) Patent No.: US 7,222,836 B2
(45) Date of Patent: May 29, 2007

(54) SELF-BALANCING POPPET

(75) Inventor: Shi Jung Chen, Irvine, CA (US)

(73) Assignee: Quantum Fuel Systems Technologies Worldwide, Inc., Irvine, CA (US)

( * ) Notice: Subject to any disclaimer, the term of this patent is extended or adjusted under 35 U.S.C. 154(b) by 0 days.

(21) Appl. No.: 10/865,961

(22) Filed: Jun. 10, 2004

(65) Prior Publication Data

US 2005/0274418 A1 Dec. 15, 2005

(51) Int. Cl.
*F16K 1/12* (2006.01)
*G05D 16/02* (2006.01)

(52) U.S. Cl. .................. 251/321; 137/505.42
(58) Field of Classification Search .......... 137/505.42, 137/625.33; 251/318, 321 I, 356
See application file for complete search history.

(56) References Cited

U.S. PATENT DOCUMENTS

| 2,195,728 A | * | 4/1940 | Jones et al. | 137/505.42 |
|---|---|---|---|---|
| 2,354,283 A | * | 7/1944 | St. Clair | 137/505.42 |
| 2,597,478 A | * | 5/1952 | Hammon | 137/505.42 |
| 2,768,643 A | * | 10/1956 | Acomb | 137/505.42 |
| 4,475,578 A | * | 10/1984 | Nidle | 251/321 |
| 5,771,852 A | | 6/1998 | Heimann, Jr. et al. | |
| 6,041,762 A | | 3/2000 | Sirosh et al. | |
| 6,155,290 A | * | 12/2000 | Nakajima et al. | 137/505.41 |

* cited by examiner

*Primary Examiner*—Stephen M. Hepperle
(74) *Attorney, Agent, or Firm*—Morrison & Foerster LLP

(57) ABSTRACT

The present invention is a poppet comprising a stem and a body, with the body having a plurality of channels extending in an longitudinal direction along the periphery of the body. The channels are gas flow conduits that react to the orientation of the poppet and force the poppet to re-align itself during operation with the centerline of the regulator chamber surrounding the poppet. The plurality of channels greatly reduces the contact between the periphery of the poppet and the regulator body. The present invention further includes a bore beginning at the non-stem end of the body and extending in the longitudinal direction within the body of the poppet. The bore can receive a spring for guiding the poppet. By positioning the spring within the poppet, the spring will have minimal contact with the regulator body. The bore avoids the spring from guiding the poppet by its end and adjusts the poppet's center of gravity toward where the poppet sits on the seat. The bore is also a part of a dead zone volume that traps debris.

10 Claims, 3 Drawing Sheets

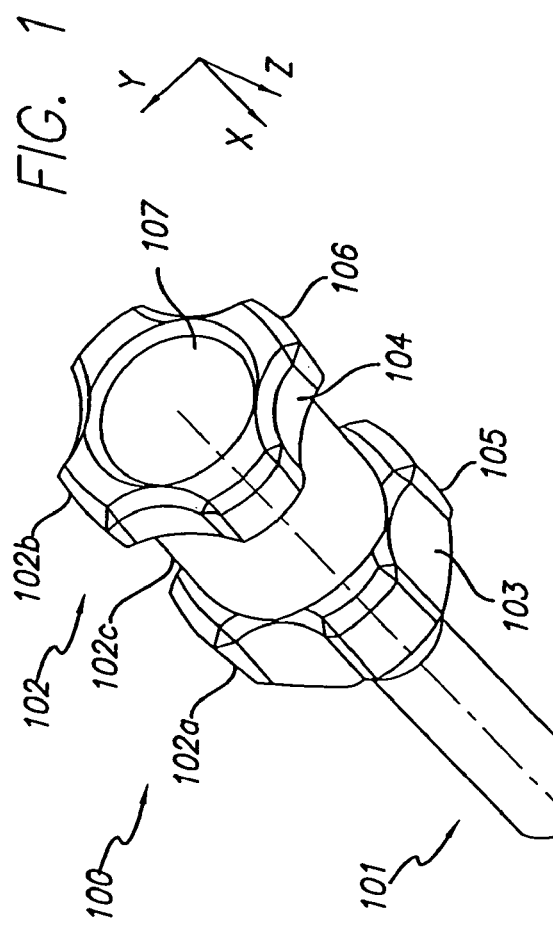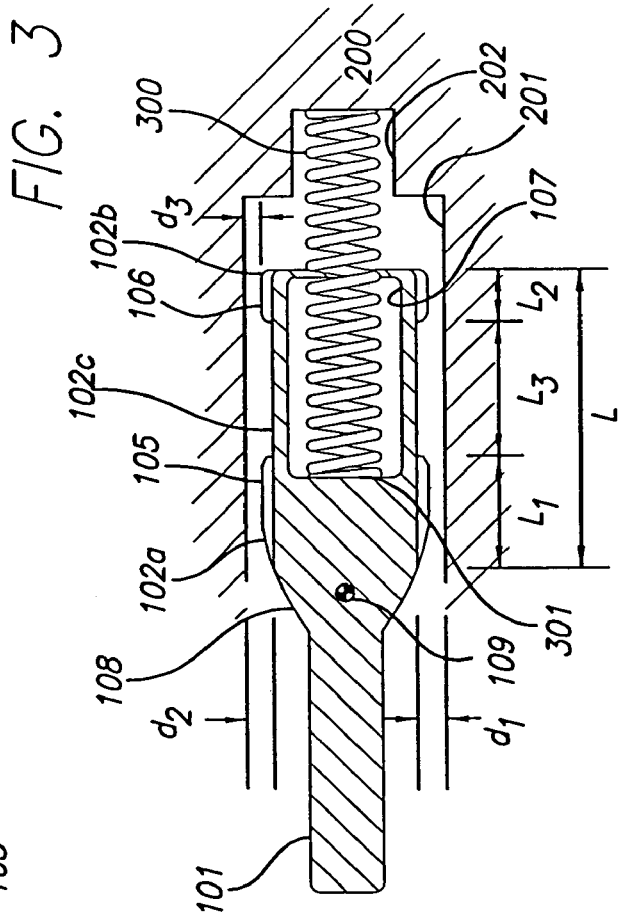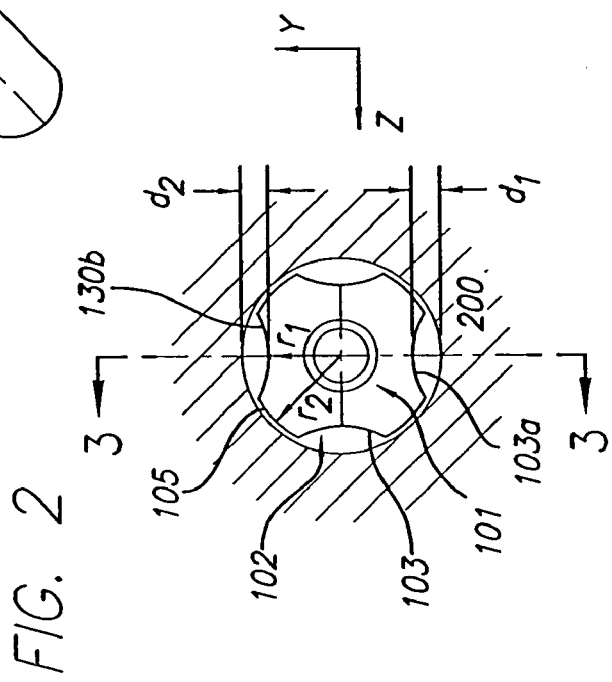

SELF-BALANCING POPPET

BACKGROUND OF THE INVENTION

The present invention relates to a self-balancing poppet in a compressed gas flow. The poppet may be used in a regulator in fuel storage and delivery systems.

Compressed gas can be stored in tanks at high pressures such as 10,000 psi. With such high pressures, the pressure of the gas must be reduced before use. To achieve the necessary pressure reduction, a regulator is typically used. The regulator has a seat and a poppet, and the dynamic motion between the seat and poppet provides the necessary pressure reduction. The poppet moves away from the seat to allow the intended outlet pressure to be reached. Once the outlet pressure is reached, the poppet sits on the seat. The contact surface between the poppet and the seat as the poppet sits on the seat seals the compressed gas from the outlet.

The seal produced by the poppet sitting on the seat is formed during the first release of the compressed gas. The poppet is pressed into the seat, which can be made of metal and non-metallic material, to form the seal surface. For every subsequent release of compressed gas, the poppet must return to the seat at the initially formed position. If the poppet returns to the seat at a different angle or lateral position, then the poppet and the seat do not completely seal the compressed gas from the outlet. The result is a leak.

Aside from its contact with the seat, the poppet is in contact with the body of the regulator. Both the poppet and the body of the regulator can be made of metal. As the poppet repeatedly moves to and from the seat, its metallic periphery rubs against the metallic surface of the regulator's body. Such rubbing creates friction which affects the movement of the poppet. It also wears away the periphery of the poppet. This not only affects the alignment of the poppet with respect to the seat but also shortens the life of the regulator. Moreover, debris is produced from the metal-to-metal contact. Given the high rate of flow, such debris can impact the seat with momentum and carve a leak path, thereby negatively affecting the seal between the poppet and the seat.

A poppet may be attached to a spring which guides the poppet by urging it toward the seat. If the spring is positioned around the periphery of the poppet, the spring will contact the metal surface of the regulator body as the poppet moves to and from the seat. As with the contact between the poppet and regulator body, the contact between the spring and regulator body generates debris. The spring's contact with the poppet can also generate debris. If such debris is not contained, it can impact the seat with momentum and carve a leak path, thereby negatively affecting the seal between the poppet and the seat.

Typically, the spring is placed at the end of the poppet. Having the poppet guided at its end is not advantageous. A small degree of tilt at the end produces a much larger lateral displacement where the poppet sits on the seat. A similar result occurs when the poppet's center of gravity is near its end. If the center of gravity of the poppet is near its end, it will rotate about its end, thereby producing a much larger lateral displacement where the poppet sits on the seat.

BRIEF SUMMARY OF THE INVENTION

It is an object of the present invention to provide a poppet that is self-balancing and will return to the seat at the initially formed position for the life of the regulator.

It is another object of the present invention to provide a poppet that has minimal contact with the regulator body.

It is another object of the present invention to provide a poppet that is guided by a spring which has minimal contact with the regulator body.

It is yet another object of the present invention to provide a poppet that is not guided at its end.

It is yet another object of the present invention to provide a poppet with a center of gravity near where it sits on the seat.

It is yet another object of the present invention to contain dynamic debris generated by the repetitive motion between the spring and the poppet and the spring and the regulator body.

To accomplish the above objects, one embodiment of the present invention is a poppet comprising a stem and a body, with the body having a plurality of channels extending in an axial or longitudinal direction along the periphery of the body. The channels are gas flow conduits that react to the orientation of the poppet. If the poppet is biased in one direction, the gas flowing in the channel corresponding to the biased direction becomes compressed. The resulting increase in pressure from the compression creates a force that re-orients the poppet until its aligned with the centerline of the regulator chamber surrounding the poppet. In this manner, the poppet is self-balancing. This self-balancing feature prevents the poppet from returning to the seat at a different angle or lateral position from the initially formed position.

The plurality of channels greatly reduces the contact between the periphery of the poppet and the regulator body. The remaining contact surface comprises the ribs between the channels. Contact between the periphery of the ribs and the regulator body, however, is limited due to the self-balancing feature of the poppet. When the poppet is balanced, a layer of compressed gas exists between the periphery of the rib and the regulator body. This layer of compressed gas acts as an gas bearing that reduces friction and debris associated with metal-to-metal contact and extends the life of the regulator.

The embodiment of the present invention further includes a bore beginning at the non-stem end of the body and extending in the longitudinal or axial direction within the body of the poppet. The bore can receive a spring for guiding the poppet. By positioning the spring within the poppet, the spring will have minimal contact with the regulator body, thereby reducing debris associated with the spring contacting the regulator body.

The bore can extend through a substantial portion of the poppet's body. A lengthy bore avoids the spring from guiding the poppet by its end. Instead, the spring couples to the poppet near where the poppet sits on the seat and thus guides the poppet through a large portion of the poppet's body. This arrangement prevents a small degree of tilt from generating a much larger displacement where the poppet sits on the seat. Moreover, a lengthy bore adjusts the poppet's center of gravity toward where the poppet sits on the seat.

In one embodiment, the body of the poppet is divided into three sections: a first body section near the stem, a second body section at the non-stem end and a third body section in between the first and second body sections. The first and second body sections are used to align the poppet in the regulator body. The third body section can have a cylindrical shape with a smaller diameter than the first and second body sections and can be aligned with the inlet passageways that deliver gas to the chamber. This allows high pressure gas to have a uniform flow from the inlet passageways and to move freely around the poppet in a circumferential direction.

The first body section may be designed to have channels allowing high pressure gas to flow through the seat as the poppet moves away from the seat. When the poppet moves away from the seat, the difference in pressure between the compressed gas and the outlet forces the gas through the seat and into an outlet chamber. The placement of channels in the first body section facilitates the flow of gas into the outlet chamber, thereby allowing it to be filled quickly. This feature is particularly important when the gas is immediately needed, such as in internal combustion and alternative fuel engines.

The second body section may abut a spring hole in the regulator body to which the spring is attached. The second body section and the spring hole in contact create a dead flow zone. The dead flow zone comprises the volume of the bore and the spring hole. In this zone, the high pressure gas is stagnant. As the poppet moves, the spring is repetitively compressed and expanded. The contact of the spring with the poppet and the regulator body during such motion may generate metal debris from the spring. The metal debris, if allowed to enter the fluid flow, can damage the seat by carving the seat and creating a leak path. The dead flow zone allows the debris to be confined in the bore and the spring hole, thereby protecting the seat from damage, increasing the life of the regulator and avoiding leakage.

These and other features and advantages of the present invention will be apparent to those skilled in the art from the following detailed description of the embodiments of the invention, when read with the drawings and the appended claims.

BRIEF DESCRIPTION OF THE SEVERAL VIEWS OF THE DRAWINGS

FIG. 1 is a perspective view of one embodiment of the present invention.

FIG. 2 is a front view of the embodiment of FIG. 1 surrounded by the body of a regulator.

FIG. 3 is a cross-sectional view of FIG. 2 taken along section 3—3.

DETAILED DESCRIPTION OF THE INVENTION

Figure 4:
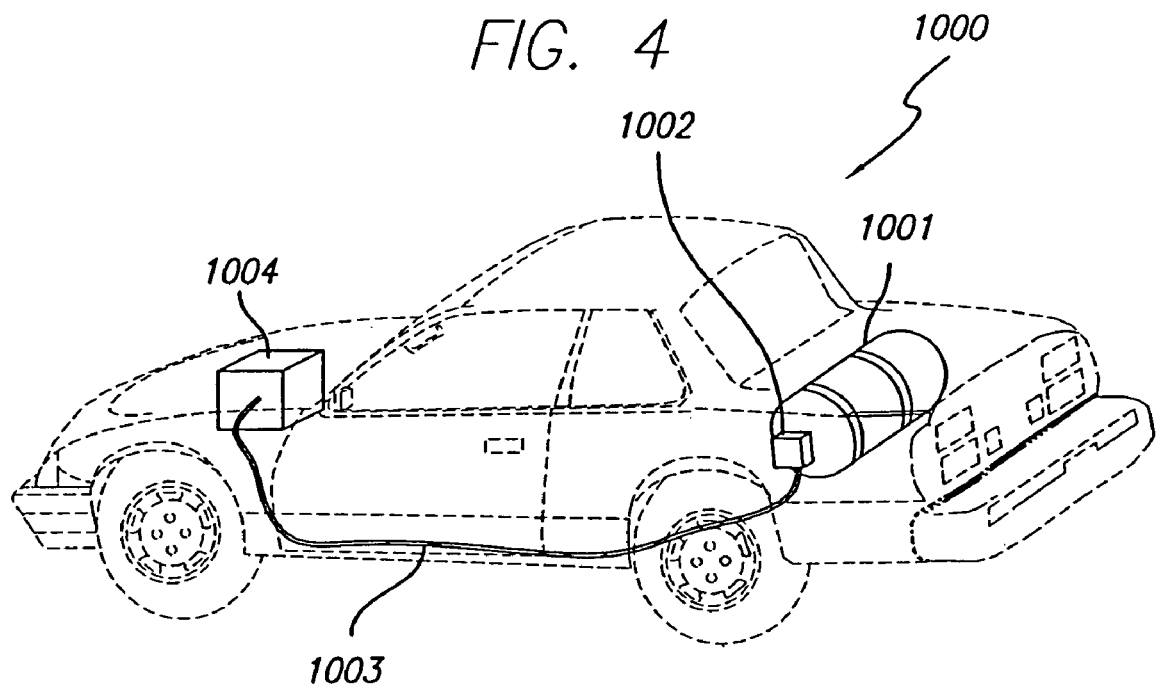
FIG. 4 is a perspective view of motor vehicle having a storage vessel and utilizing an apparatus for regulating a fluid.

In the following description of preferred embodiments, reference is made to accompanying drawings which form a part hereof and in which is shown by way of illustration specific embodiments in which the invention may be practiced. It is to be understood that other embodiments may be utilized and structural changes may be made without departing from the scope of the preferred embodiments of the present invention.

FIGS. 1–3 illustrate one embodiment of the present invention in different views. The following description will reference all three figures. It should be noted that all figures display the appropriate directional markers. For the purposes of the following description, the x-direction may also be referred to as the axial direction or the longitudinal direction while the y-direction may also be referred to as the vertical direction. It should also be noted that FIG. 1 does not illustrate the regulator body 200 as illustrated in FIGS. 2 and 3 nor the spring 300 as illustrated in FIG. 3.

The poppet 100 comprises a stem 101 and a body 102 tapering at one end to the stem 101. This end of the body is sometimes referred to herein as the stem-end of the body, and the body's other end is sometimes referred to as the non-stem end. The body 102 can be further divided into a first body section 102a (near the stem-end but not including the tapered section 108), a second body section 102b and a third body section 102c between the first body section 102a and the second body section 102b. The first body section 102a has a plurality of channels 103 interleaved with ribs 105. Each channel 103 extends in the longitudinal direction along the periphery of the first body section 102a. It should be noted that the term channel refers to a groove or indentation on the periphery of the poppet and is not to be limited in any way in terms of shape, size or texture.

The second body section 102b also has a plurality of channels 104, each extending in the longitudinal direction along the periphery of the second body section 102b. As with the first body section 102a, the second body section 102b includes ribs 106 interleaved with the channels 104. The poppet 100 further comprises a bore 107 extending in the longitudinal direction from its non-stem end.

As illustrated in FIGS. 2 and 3, the poppet 100 is positioned within a chamber 201 of the regulator body 200. During operation, the poppet 100 moves back and forth in the chamber 201 along the longitudinal direction. A fluid, such as compressed hydrogen gas, flows along the channels 103 and 104, separating the poppet 100 from the surface of the chamber 201. The distance between the chamber surface and the surface of the lower-side channel 103a is $d_1$ while the distance between the chamber surface and the surface of the upper-side channel 103b is $d_2$.

As discussed above, it is preferable for the poppet 100 to maintain its alignment with the centerline of chamber 201. The distance $d_1$ would be equal to the distance $d_2$ at this position. However, during operation, the poppet 100 may be biased in one direction. For example, if the stem-end of the body 102 descends in a vertical direction, the distance $d_1$ will be less than the distance $d_2$. The reduction in the distance $d_1$ and the corresponding reduction in volume compresses the gas flowing along channel 103a. As is known to one of ordinary skill in the art, the pressure of the compressed gas will increase and will exert a force on the poppet 100. The force will push the poppet 100 in a vertical direction, until the pressure on the upper-side channel 103b is equal to the pressure on lower-side channel 103a and the distance $d_1$ is equal to the distance $d_2$. In this manner, the poppet 100 is self-balancing. This feature prevents the poppet from having a biased position, particularly as it returns to the seat, and ensures that the poppet will return to the seat at the initially formed position.

The self-balancing feature works regardless of whether the poppet is biased downwardly or upwardly in the y-direction or whether the poppet is biased in the y-direction or the z-direction.

As illustrated in FIGS. 1 and 2, the channels 103 and 104 significantly reduce the contact surface of the poppet 100. The contact surface comprises the ribs 105 between the channels 103 in the first body section 102a and the ribs 106 between the channels 104 in the second body section 102b. Contact between the ribs 105, 106 is further limited by the self-balancing feature of the poppet 100. When the poppet is balanced, a layer of compressed gas exists between the periphery of each rib and the surface of chamber 201 which is displayed as the distance $d_3$ in FIG. 3. This layer of compressed gas acts as a bearing that reduces friction, reduces any debris associated with metal-to-metal contact and extends the life of the poppet and the regulator. It should be noted that the poppet of the present invention does not have to be made of metal. To further reduce contact debris, the poppet may be made of non-metallic materials such as plastics and ceramics. The poppet can also be a hybrid having metal embedded in plastic.

The contact surface of the poppet 100 is further reduced through the structure of the third body section 102c. The third body section 102c has a cylindrical shape (although other shapes can be employed). As illustrated in FIGS. 1 and 2, the radius of the third body section 102c is equal to the radial length $r_1$, which is the distance from the centerline of the poppet 100 to the lowest point of channel 103, 104. In contrast, the distance $r_2$ from the centerline of the poppet 100 to the periphery of the rib 105, 106 is longer. Accordingly, the periphery of the third body section 102c never contacts the surface of chamber 201.

This feature can be further maximized by extending the length $L_3$ of the third body section 102c with respect to the length $L_1$ of the first body section 102a and the length $L_2$ of the second body section 102b. FIG. 3 illustrates that the length $L_3$ is longer than the length $L_1$ of the first body section 102a and the length $L_2$ of the second body section 102b. Furthermore, length $L_3$ can be longer than the combined length of $L_1$ and $L_2$. Of course, other combinations can be used, such as having the length $L_3$ equal to the combined length of $L_1$ and $L_2$.

In this manner, the length of contact is not the entire length L of the body 102, but rather is limited to the sum of $L_1$ and $L_2$. Limiting the contact length is particularly advantageous when the regulator is not in use, such as when the regulator is being shipped. No compressed gas flows through the chamber 201 of the regulator 200 when it is not in use. The poppet 100 accordingly rests on the surface of chamber 201 without a gas bearing. However, the poppet 100 may still move in transit. Minimizing the contact length between the poppet 100 and the chamber 201 limits friction associated with such movement and extends the life of the regulator.

Contact with the surface of the chamber 201 is further limited by the placement of the spring 300. The spring 300 is attached loosely or firmly at one end to the spring hole 202 of the regulator 200. The bore 107 receives the other end of the spring 300 near the stem-end of the body as conventionally illustrated at reference numeral 301. As a result, the spring 300 is not positioned on the periphery of the body 102 of the poppet 100, but rather is positioned within the body 102. This structure minimizes the contact between the spring 300 and the surface of chamber 201, thereby reducing the debris associated with such contact.

It should be noted that the positioning of the spring 300 has an additional benefit. In certain regulators, the spring hole 202 may not be properly aligned with the chamber 201 due to machining error. If poppet is designed to have a body section inserted in the hole, the poppet will be misaligned as well. In contrast, spring 300 (rather than the poppet body) is coupled to the spring hole 201 and, thus, compensates for any misalignment between the spring hole 202 and the chamber 201 without affecting the alignment of the poppet 100.

The bore 107 that receives the spring 300 extends in the longitudinal direction from the non-stem end of the poppet 100. As illustrated in FIG. 3, the length of the bore 107 extends through the second body section 102b and the third body section 102c. As discussed above, a small degree of tilt at the non-stem end produces a large displacement where the poppet sits on the seat. The length of the bore 107 avoids such a large displacement. The bore's length allows the spring 300 to be connected to the poppet 100 at reference numeral 301, thereby coupling the spring to the poppet where it sits near the seat and utilizing a substantial portion of the body 102 of the poppet 100 for guidance. In this manner, a small degree of tilt at 301 produces a much smaller displacement where the poppet sits on the seat as compared to the same small degree of tilt at the non-stem end of the poppet 100.

The bore's length also affects the center of gravity of poppet 100. A poppet rotates about its center of gravity during operation. It is preferable to have the center of gravity near where the poppet sits on the seat as opposed to near the non-stem end for the same reasons as discussed immediately above. Because the bore 107 is hollow, a lengthy bore shifts the center of gravity toward where the poppet 100 sits on the seat. As illustrated in FIG. 3, the poppet's center of gravity 109 is near where the poppet 100 sits on the seat (not illustrated).

The present invention is not limited to the embodiment illustrated in FIGS. 1–3. Many structural variations can be made without departing from the scope of the invention.

Although FIGS. 1 and 3 illustrate a body 102 separated into three sections, the body 102 of the present invention may be separated into any number of sections or no sections at all. If the present invention employs body sections, it is not limited to the arrangement illustrated in FIGS. 1 and 3 with a small third body section 102c sandwiched between larger body sections 102a, 102b.

FIGS. 1 and 3 illustrate the body sections 102a, 102b, 102c, but do not reference the tapered section 108 of the body 102 as a body section. The tapered section 108 can have any of the features of the body sections disclosed herein, such as channels. Furthermore, FIG. 3 illustrates the body 102 and the stem 101 as being integral. The present invention may have a stem 101 and a body 102 that are separate members joined together in any manner.

Although FIG. 1 illustrates four channels 103 on the first body section 102a and four channels 104 on the second body section 102b, any number of channels may be used. FIG. 1 also shows that the four channels 104 on the second body section 102b are aligned with the channels 103. The number of channels in each body section do not have to be equal nor do channels between body sections have to be aligned.

Although FIG. 1 illustrates the channels 103 extending linearly along the periphery of the first body section 102a, the channels 103 may extend in any manner along the periphery of the body. For example, the channels 103 may extend in a spiral manner. FIG. 1 also illustrates each channel extending linearly, whereas the present invention may have one or more channels extending in one manner with one or more channels extending in another manner. FIG. 1 also illustrates the channels 104 of the second body section 102b extending linearly along the second body section 102b. The present invention is not limited to having each body section have their respective channels extend in the same manner.

FIG. 1 also shows that each of the channels 103 has a predetermined length. In the case of a body 102 without any sections, the channels can extend from one end of the body to another end or any other length. It should be noted that the present invention may have the body or a body section where the channels in the body or body section have different lengths. For example, one or more channels can extend for the full length of the body or body section, with one or more other channels extending for a half length of the body or body section. It should also be noted that FIG. 1 further shows the length of the channels 103 is different than the length of the channels 104. The present invention may have body sections in which the channels are the same length in all or some of the body sections.

Although FIG. 2 illustrates channels 103 as having an arcuate cross-sectional shape, the present invention is not limited to channels having arcuate shapes. Other shapes, such as rectangular and semi-circular, can be chosen. FIG. 2 further illustrates that the same arcuate cross-sectional shape is utilized for each channel. The present invention may employ channels in the body or a given body section or sections with different cross-sectional shapes. FIG. 2 also illustrates each channel having the same radial length $r_1$ and each rib having the same radial length $r_2$. The present invention may have channels with different radial lengths $r_1$ and ribs having different radial lengths $r_2$.

FIG. 1 illustrates the same arcuate cross-sectional shape in the first body section 102a and the second body section 102b. The present invention may employ different cross-sectional shapes in different sections, and different radials lengths $r_1$ and $r_2$ in different sections.

FIG. 3 illustrates the bore 107 extending through the second body section 102b and the third body section 102c. The bore may have a different length. Furthermore, the bore 107 is not limited to having a cylindrical shape. It can, for example, be tapered or have a frustum shape. FIG. 3 also illustrates the third body section 102c having a radius that is equal to the radial length $r_1$. The radius of the third body section 102c may be greater than or smaller than radial length $r_1$. If the radius of the third body section 102c is greater than radial length $r_1$, it may be equal to radial length $r_2$ and, thus, flush with the periphery of the first body section 102a and the second body section 102b. If the third body section 102c is not cylindrical, it may have a radial length from the poppet's centerline that is less than, equal to or greater than the radial length $r_1$.

FIG. 4 illustrates a motor vehicle 1000 utilizing an apparatus for regulating a fluid. The motor vehicle 1000 may be an alternative fuel vehicle, with the storage vessel 1001 storing hydrogen, compressed natural gas or any other alternative fuel. The storage vessel 1001 is connected to a module 1002. The module 1002 is, in turn, connected to a fuel line 1003. The fuel line delivers the alternative fuel to engine 1004. The engine 1004 can be an alternative fuel engine such as a hydrogen fuel cell.

Figure 5:
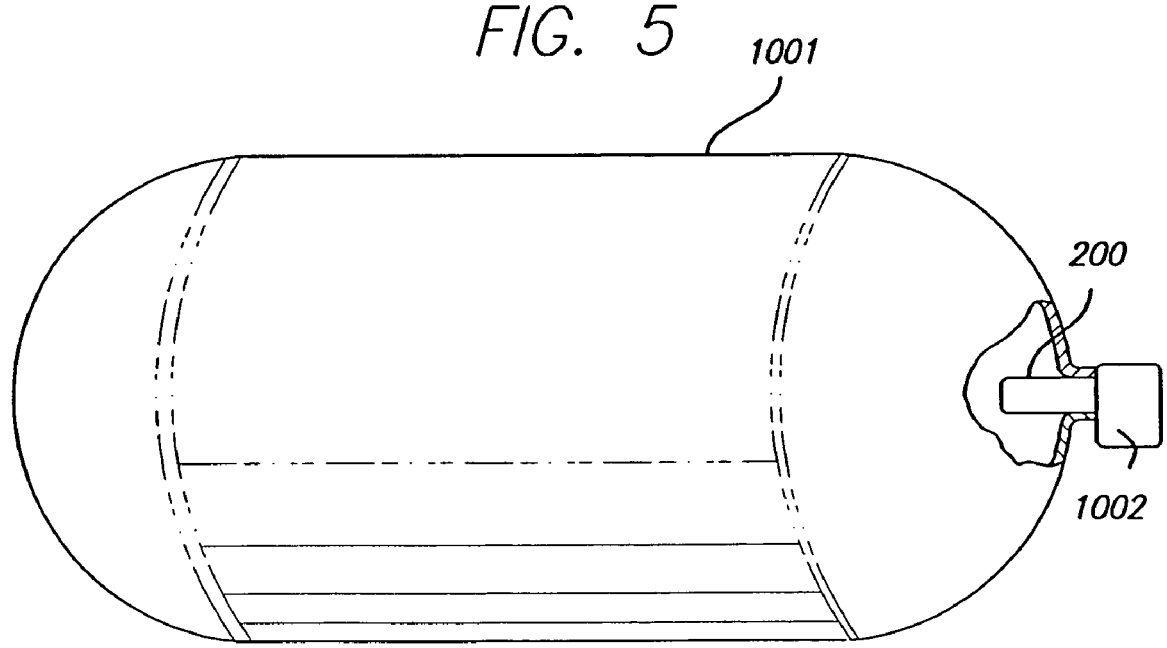
FIG. 5 is a perspective view of the storage vessel of FIG. 4 with an partial internal view illustrating the apparatus of FIG. 4.

FIG. 5 provides a partial internal view of the storage vessel 1001. Mounted onto to the module 1002 is the apparatus 200 for regulating the alternative fuel.

Figure 6:
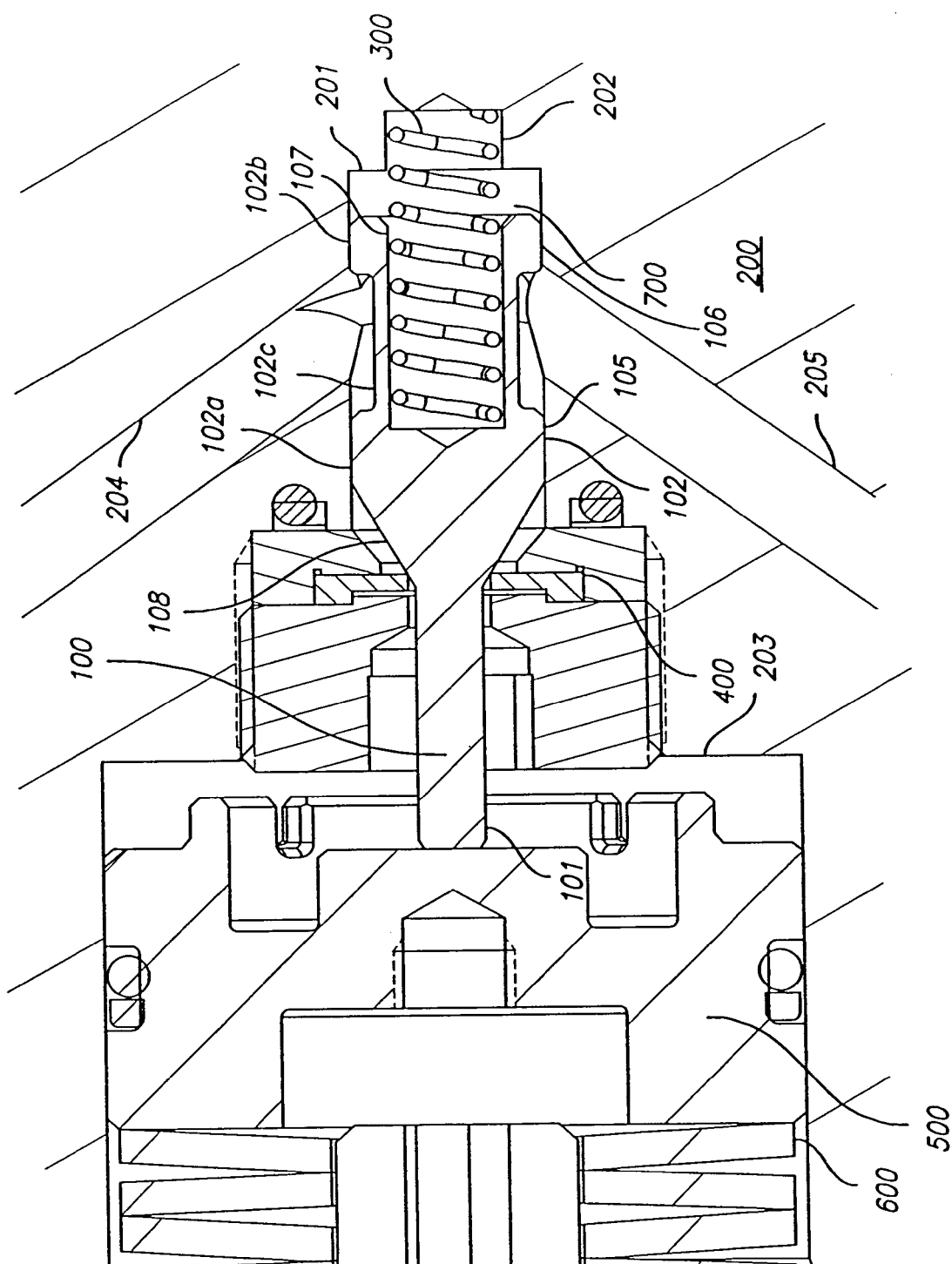
FIG. 6 is a partial cross-sectional view of the apparatus of FIG. 5.

FIG. 6 illustrates a partial cross-sectional view of the apparatus 200 for regulating the alternative fuel. The apparatus is, without limitation, a regulator. Reference numerals in FIG. 4 that are the same as reference numerals in FIGS. 1–3 refer to the same structural component.

The apparatus comprises a body 200 having a first chamber 201 and a second chamber 203. In the first chamber 201, a poppet 100 and a spring 300 are positioned. One end of the spring 300 is coupled to the body 200 within spring hole 202. The other end of the spring 300 is coupled to poppet 100. Bore 107 of the poppet 100 receives the spring 300. Poppet 100 has a stem 101 and a body 102 tapering to the stem 101 as indicated by reference numeral 108. The body is divided into three body sections, with a first body section 102a, a second body section 102b and a third body section 102c between the first body section 102a and the second body section 102b. The first body section 102a has a plurality of channels (not shown) extending in a longitudinal direction along the periphery of the first body section 102a. The channels are interleaved with ribs 105. The second body section 102b has a plurality of channels (not shown) extending in the longitudinal direction along the periphery of the second body section 102b. These channels are interleaved with ribs 106. The third body section 102c has a radial length that is less than the radial length to the ribs 105, 106 from the centerline of the poppet 100.

Poppet 100 is movable in the longitudinal direction in the first chamber 201 for regulating the flow of a fluid between the first chamber 201 and the second chamber 203. As discussed above, the fluid may be a gas, such as hydrogen fuel, natural gas and other compressed gases. The gas flows from a storage tank 1001 to the apparatus 200 in a manner known to one of ordinary skill in the art. The gas is delivered to the first chamber 201 through inlet passageways 204 and 205. The third body section 102c is aligned with the inlet passageways 204 and 205. This allows the entering gas to have a uniform flow and to move freely in a circumferential direction around poppet 100, including the third body section 102c. The gas and the spring 300 urge the poppet 100 in a longitudinal direction toward the second chamber 203. In the second chamber 203, a piston 500 is slidably arranged and urged by piston spring 600. As the gas and the spring 300 urge the poppet 100 toward the second chamber, the stem 101 of the poppet 100 extends through a seat 400 and abuts the piston 500 in the second chamber 203. When the desired pressure is reached in the second chamber 203, the tapered section 108 of the poppet 100 rests on seat 400, thereby sealing the compressed gas in the first chamber 201 from the second chamber 203. FIG. 6 illustrates the poppet 100 at this position.

The gas in the second chamber 203 may be used, for example, to fuel the alternative fuel engine 1004 (or any equipment requiring the regulation and control of high pressure gases). As the gas is used, the pressure of the second chamber 203 is reduced. The reduction in pressure allows the piston spring 600 to urge the piston to push the stem 101. The poppet 100 moves away from the seat, thereby allowing compressed gas to refill the second chamber 203 at the desired pressure.

In this manner, the poppet 100 is movable in the longitudinal direction to and from the seat 400 for regulating fluid. If the poppet 100 becomes biased as it is moves, the plurality of channels on the first body section 102a and the second body section 102b allow it to re-align itself as discussed above and to return to the seat 400 at the initially formed position. The plurality of channels and the radial length of the third body section 102c reduce the amount of contact between the poppet 100 and the surface of the first chamber 201. The gas bearing further reduces any chance of contact. Moreover, the placement of the spring 300 in the bore 107 eliminates the contact between the spring 300 and the surface of the chamber 201 and avoids the poppet 100 from being guided by the spring 300 at its non-stem end. The length of the bore allows the center of gravity of the poppet 100 to be near where the poppet 100 sits on the seat 400 as well.

As the poppet 100 moves back and forth in the longitudinal direction, the spring 300 may contact the regulator body or the poppet 100. Such contact may shred metal chips off the spring 200, the poppet 100 or even the regulator body. If the debris enters the flow of gas as the gas enters the first chamber 201 from inlet passageways 204 and 205, it can damage the seat 400 and other parts. To confine such debris, the apparatus 200 maintains a volume 700 between the non-stem end of the poppet 100 and the surface of the spring hole 202. The volume comprises the volume of the bore 107, spring hole 202 and a portion of the first chamber 201. In the position illustrated in FIG. 6, the pressure in the volume 700 and the remainder of the overall chamber 201 is the same. Thus, no gas is exchanged between the volume 700 and the remainder of the overall chamber 201, and any debris associated with the spring 300 remains in volume 700. When the poppet 100 moves away the seat, the pressure in the volume 700 increases slightly and compressed gas enters chamber 201 through inlet passageways 204 and 205. Any debris associated with spring 300 is trapped in the volume 700 and is not introduced into the gas that enters the second chamber 203. Thus, although the volume 700 changes as the poppet 100 moves in the longitudinal direction, the high pressure gas in this volume is stagnant. The stagnant high pressure prevents any gas from entering volume 700 and prevents any debris from entering into the gas flow.

Although the present invention has been described with the use of hydrogen compressed gas, any type of fluid whether compressed or otherwise may be used. The fluid furthermore is not limited to a gas. Although the present invention has been described in connection with an alternative fuel vehicle, it can be used with any type of motor vehicle including, but not limited to, motor vehicles having internal combustion engines operating on gasoline and motor vehicles having hybrid combustion/electrical engines. It should be noted that present invention may also be used in stationary devices, such as refueling stations, or any other gas management systems.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A poppet positioned in a regulator body having at least one inlet passageway, said poppet comprising:
    a stem; and
    a body, said body having
        a first end and a second end, said first end tapering to the stem;
        a first section near the first end and having an outer diameter, a second section near the second end and having an outer diameter and a third section between the first and second sections, said third section having an outer diameter that is less than the outer diameters of the first and second sections;
        a bore extending in a longitudinal direction from the second end; and
        a plurality of channels extending in the longitudinal direction only along the periphery of the first section and the periphery of the second sections,
        wherein said at least one inlet passageway intersects said bore at said third section.

2. The poppet of claim 1, wherein each of the plurality of channels extends linearly along the periphery of the first section or the periphery of the second section.

3. The poppet of claim 1, wherein each of the plurality of channels has an arcuate shape in a direction perpendicular to the longitudinal direction.

4. The poppet of claim 1, wherein the third section is longer in the longitudinal direction than each of the first and second sections.

5. The poppet of claim 1, wherein the third section is cylindrical.

6. The poppet of claim 1 wherein the outer diameters of the first and second sections are equal.

7. The poppet of claim 1, wherein the bore extends through the second and third sections.

8. The poppet of claim 1, wherein the plurality of channels comprises a plurality of channels extending along the periphery of the first section and a plurality of channels extending along the periphery of the second section and wherein the plurality of channels in the first section are aligned with the plurality of channels in the second section.

9. The poppet of claim 1, wherein the plurality of channels comprises at least four channels along the periphery of the first section.

10. The poppet of claim 1, wherein the stem and the body are integral.

* * * * *